March 18, 1930.   L. DE MARKUS ET AL   1,750,879
FILTER
Filed Nov. 10, 1926   7 Sheets-Sheet 1

March 18, 1930. L. DE MARKUS ET AL 1,750,879
FILTER
Filed Nov. 10, 1926 7 Sheets-Sheet 5

INVENTOR

Patented Mar. 18, 1930

1,750,879

UNITED STATES PATENT OFFICE

LOUIS DE MARKUS, OF CHICAGO, ILLINOIS, AND FREDERICK B. LEOPOLD, OF PITTSBURGH, PENNSYLVANIA; SAID LEOPOLD ASSIGNOR TO McKENNA BRASS AND MANUFACTURING COMPANY, INC., OF PITTSBURGH, PENNSYLVANIA, A CORPORATION OF PENNSYLVANIA

FILTER

Application filed November 10, 1926. Serial No. 147,436.

This invention relates to filters, and particularly to a self-contained filter unit which may be readily inserted in a fluid line and used, for example, in bottling plants or the like. Filters of this general character as heretofore constructed have comprised either small inaccessible sand filters or have been of the paper disk type, employing a large number of sheets of filter paper at one time.

All of such filters have been open to numerous disadvantages. The sand filters employed have not been provided with proper means for inspection or washing and have generally been so small that they have necessarily been operated at far beyond their proper capacities. As a result, such filters, instead of purifying the water, have in many cases proved to be a positive menace to health because of bacteriological growths therein.

The paper filters heretofore employed have generally required the perforation of the paper sheets. Like sand filters, the operation of the paper filters heretofore used has been "blind" and the user has no means of knowing if the water was by-passing the filter or not.

We provide a non-porous filter, such as a sand filter, a porous filter, preferably employing paper disks, and pass the water successively through the non-porous filter and the porous filter. Preferably the non-porous filter is embodied in a chamber of which the porous filter forms a cover. Means is provided for reversing the flow of water through the non-porous filter so that it may be washed as often as desired. The porous fitler is in several parts, each of them being hinged on the main container. They may be swung out of the way so that the non-porous filter is entirely open during the washing step. This is of great value as it insures proper washing. After the washing is completed, the filter chamber is closed and the water is handled at pipe line pressure. As above stated, pressure filters as heretofore constructed have not been arranged for a visible wash.

The non-porous filter is effective for accomplishing the major part of the filtration, while the porous filter acts as a safety for the non-porous filter and gives a final "polish" to the water. In addition it serves as an index of the condition of the non-porous filter, since the discoloration of the paper disks shows how effective the sand filter has been.

In order to prevent the operation of the filter at a rate greater than the safe filtration rate, we provide a controller which limits the amount of fluid taken off from the filter per unit of time.

The water is preferably supplied to the sand filter through a conduit terminating in a pan above the filter medium. The rim of this pan is preferably concentric with respect to the walls of the filter chamber. The pan is also used to take off the wash water when the flow through the filter is reversed. The concentric arrangement is particularly valuable in the latter step. The washing operation is effective for regrading the sand particles, that is to say, arranging particles of increasing fineness from the bottom to the top of the filter, and the concentric arrangement is of value in ensuring accurate grading.

As above stated, the porous filter is preferably arranged as a cover for the non-porous or sand filter. The cover is preferably made in three parts, the lower one being effective for completely closing off the sand filter chamber and being in itself a shallow pan, open at the top. The top of this pan is covered with a perforated metal sheet adapted to receive a disk of filter paper. The next section of the filter comprises a ring open at top and bottom, and having perforated metal plates on its top and bottom faces. The top section is closed off above and is provided with a perforated metal plate below. The filter disks lie between these perforated metal plates when the parts are assembled. Water from the sand filter is supplied to the top and bottom sections and passes through the filter disks to the intermediate section from which it is taken off. Means are provided for making a fluid connection between the filter proper and the several sections. The above described arrangement permits of using uninterrupted disks of paper. The sections are so arranged that the edge of each disk is completely exposed. This enables the user to make certain at all times that the disks are functioning in the proper way.

A certain amount of water oozes out through the exposed edges of the paper and a trough on the main chamber is provided for catching this water and feeding it to the drain.

Preferably, the flow of water through the filter is controlled by a single valve having a closed position, a wash position and a filter position.

In the accompanying drawings which illustrate the present preferred embodiment of our invention.

Figure 1:
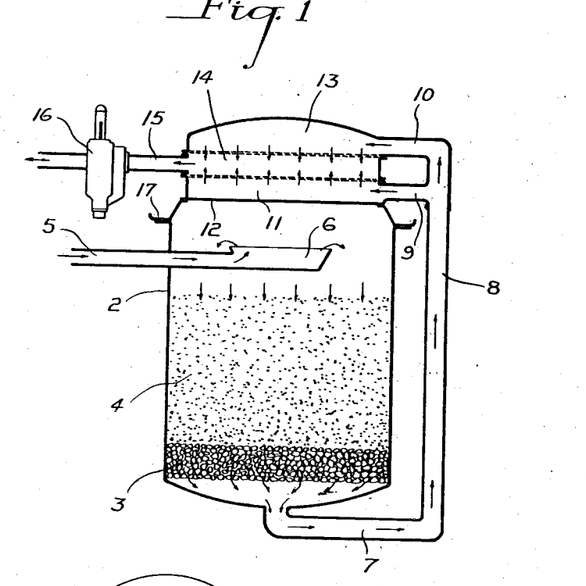
Figure 1 is a diagrammatic view showing the filter in operation.
Figure 2:
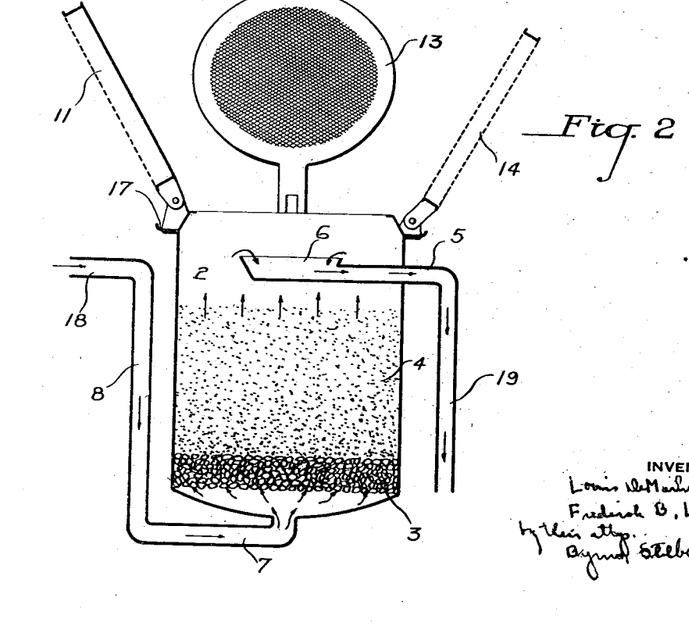
Figure 2 is a similar view showing the parts arranged for washing and also illustrating the flow of water during the washing step.

Referring first to Figures 1 and 2, there is shown a chamber 2 containing a non-porous filter medium. This filter medium comprises a lower layer 3 of gravel and a body 4 of sand. The chamber is completely enclosed during operation so that the filter may be operated under pressure.

Raw water is supplied through a conduit 5 to a pan 6. The water overflows the rim of the pan 6 and passes downwardly through the filter medium. It is taken off through a conduit 7 having an upwardly extending portion 8. Near the top of the upwardly extending portion 8 the water is divided and passes through branch conduits 9 and 10. The branch conduit 9 leads to a container 11 having a bottom wall 12 which acts as a cover for the chamber 2, and having a top made of perforated metal plate. The conduit 10 leads to a pan-like container 13 which is closed off at the top and which is provided with a perforated metal bottom. Intermediate the containers 11 and 13 is a flat container 14 which is provided with perforated metal plates at top and bottom. Disks of filter paper are placed between the perforated metal sheets and the water passes from the chambers 11 and 13 to the chamber 14 through these paper disks. The paper disks complete the filtration and act as a safety for the sand filter.

The filtered water leaves the chamber 14 through a conduit 15 and passes through a rate controller indicated generally by the reference character 16. This rate controller is effective for limiting the amount of water which may pass through the filter per unit of time.

It will be noted that the conduits 9, 10 and 15 terminate in the side walls of their respective containers 11, 13 and 14, so that there is no necessity for perforating the paper disks as in other types of filters. The edges of the disks are exposed all around. A trough 17 is provided for catching the drip from the edges of the disks.

In Figure 2 the various parts are shown in washing position. It will be noted that the containers 11, 13 and 14 have been thrown back so that the sand filter is open. Wash water is supplied through a conduit 18 which leads into the conduit portion 8 and thence through the conduit 7 to the bottom of the filtration chamber. The wash water passes up through the gravel 3 and the sand 4, removing all collected matter and also regrading the sand particles. The water rises in the container 2 until it reaches the rim of the pan 6. The wash water flows into the pan through the conduit 5 and is discharged through a branch conduit 19.

The rim of the pan 6 is concentric with the chamber walls. It is found in practice that this materially aids in the accurate grading of the sand particles.

Figures 1 and 2 show merely the principal features of the filter in diagram. The remaining drawings show it as actually constructed. The chamber 2 is placed upon feet 20 and is provided with a flanged bottom 21 above which is placed an inside bottom plate 22. The space between the bottoms 21 and 22 constitutes a liquid receiving chamber 23 into which the conduit 7 is connected. A number of studs 24 extend upwardly from the bottom plate 22 so as to support a perforated metal plate 25 at some distance from the bottom plate 22. The intermediate space is filled with gravel which is preferably graded from coarse to fine, as shown. The water passes through openings in the bottom plate 22 through strainers 26 of the usual type. The container is filled with sand above the perforated plate 25, as shown.

There may be some tendency for foreign matter to collect above the bottom plate 21. This plate is bulged so as to cause such matter to be near the edges of the filter, and plugs 21ª permit of flushing out such collected matter whenever desired.

Figure 3:
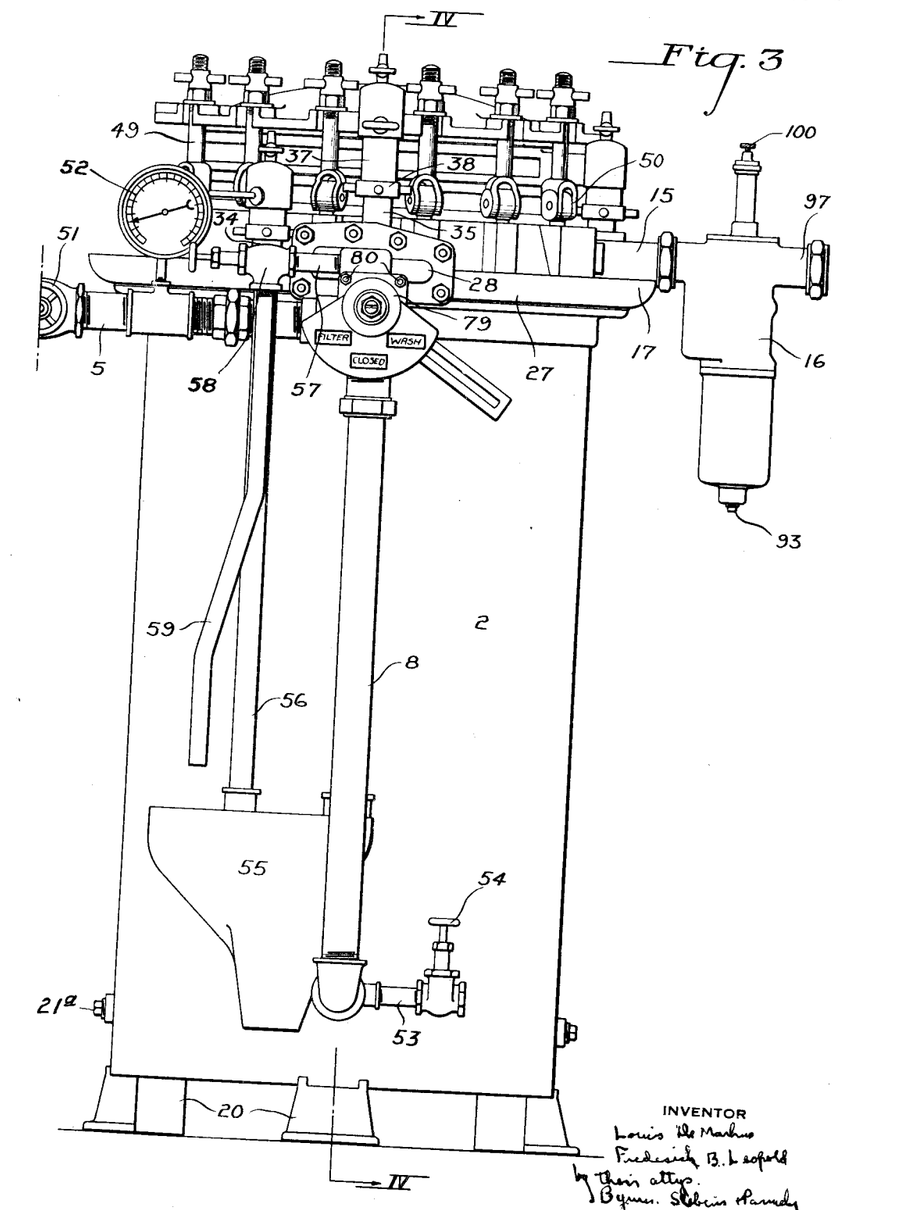
Figure 3 is a side elevation of the filter.
Figure 4:
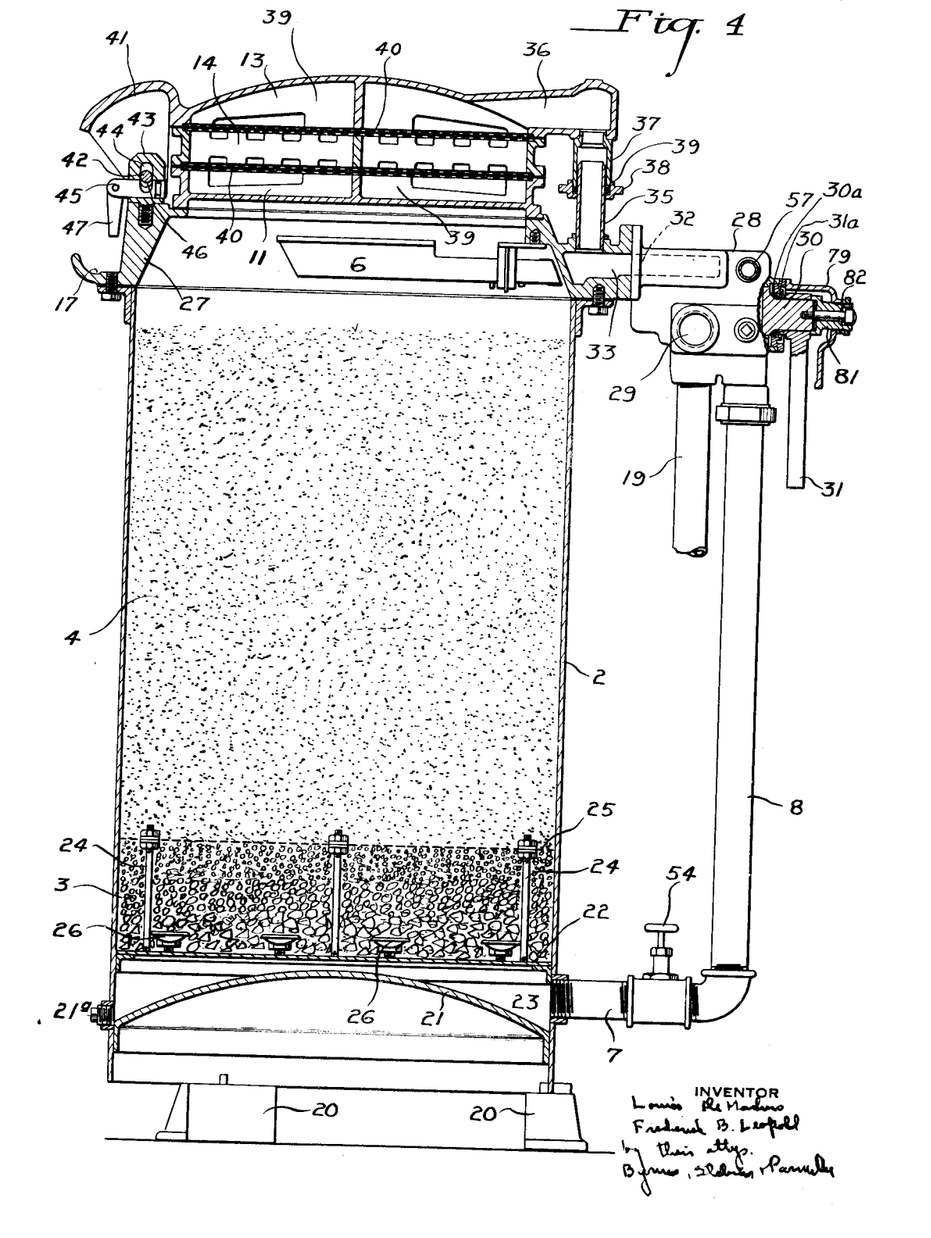
Figure 4 is a vertical section taken on the line IV—IV of Figure 3.
Figure 5:
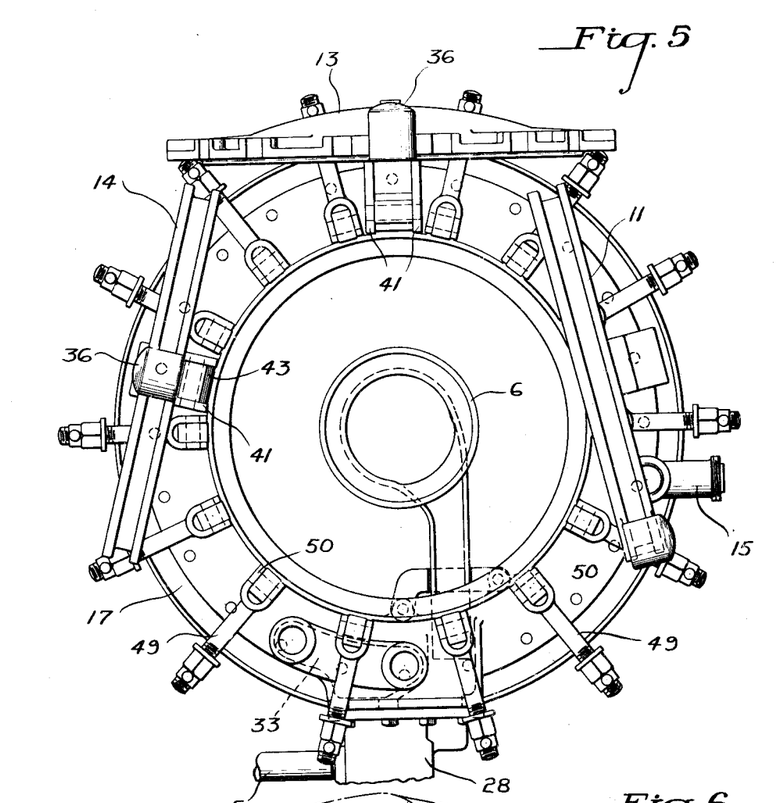
Figure 5 is a top plan view of the filter with the covers in raised position.

The top portion of the container 2 is made from a casting 27. A control valve, indicated generally by the reference character 28, is secured to this casting as best shown in Figures 3, 4 and 5. Water enters the control valve from the conduit 5 through an opening 29. The valve is provided with a tapered plug 30, having a handle 31 movable to different positions. When the handle is in the "filter" position, water is free to pass from the conduit 5 to the pan 6, and thence to the sand filter. It then returns through the conduits 7 and 8 to the control valve and passes therethrough to an outlet 32. This outlet communicates with a chamber 33 in the casting 27. Upstanding pipes 34 and 35 lead from the chamber 33. The pipe 34 is intended to supply water to the chamber 11 and the pipe 35 is intended to supply water to the chamber 13.

Each of these containers is provided with a hollow extension 36 extending outwardly and over the pipe 34 or 35, as the case may be. A hollow neck 37 is connected to the extension 36 and is provided at its lower end with a nut 38. A yieldable rubber packing 39 is placed inside the nut 38 and against the end of the neck 37. When a container is in the position of Figures 3 and 4, the neck 37 embraces the upstanding end of the pipe 34 or 35 as the case may be, and tightening of the nut 38 is effective for compressing the packing and making a substantially water-tight joint. A free water path is thus provided from the valve 28 to the interior of each of the containers 11 and 13.

Each of the containers 11, 13 and 14 is provided with radially extending ribs 39 which are effective for strengthening the container itself, and also supporting the perforated plates 40.

Figure 6:
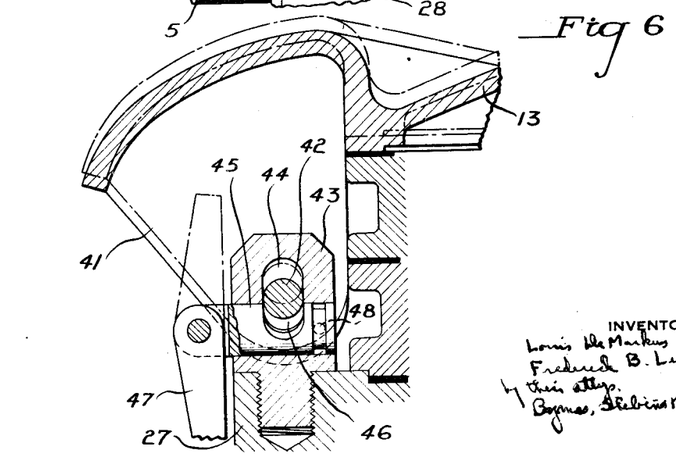
Figure 6 is a detailed view to enlarged scale showing the manner in which the covers are hinged.
Figures 7, 8:
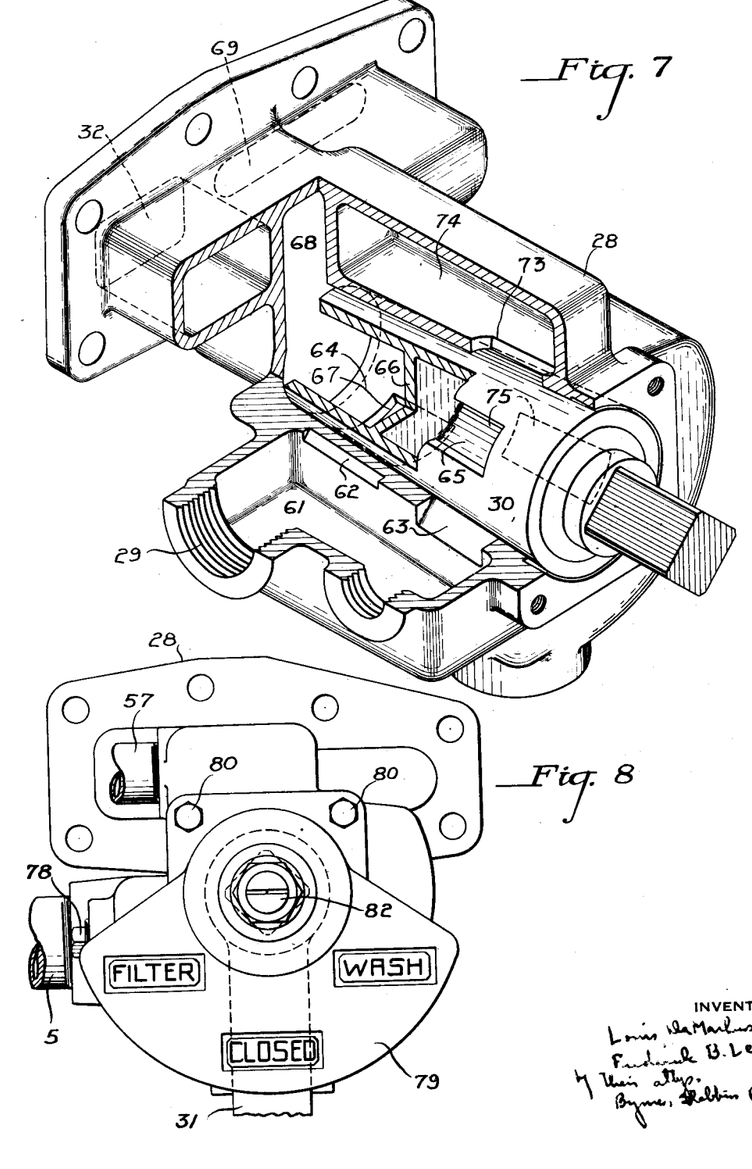
Figure 7 is a perspective view partly broken away showing the control valve.
Figure 8 is an end view of the valve.
Figure 9:
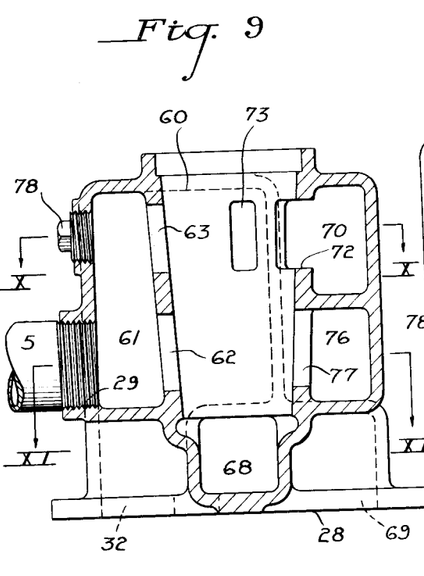
Figure 9 is a horizontal section through the control valve body looking upwardly, the plug being removed.

Each of the containers 11, 13 and 14 is further provided with wings 41 adapted to receive a hinge pin 42 fitting through a block 43. The block 43 is secured to the casting 27 and acts as the stationary half of the hinge. The pin 42 does not make a tight fit with the block 43, but fits into a vertically extending slot 44. A cam rod 45 having a cut out portion 46 extends through the block 43 at right angles to the pins 42. It is provided with a handle 47 by which it may be rotated as desired. A dog pointed set screw 48 holds the cam rod 45 in place. The normal position of the hinge pin 42 is shown in solid lines in Figure 6, and it will be noted that the pin lies at least in part in the slot 46 of the cam rod 45. If the handle 47 is moved to the chain line position of Figure 6, the hinge pin 42 is cammed upwardly in the slot 44 to the dotted line position of Figure 6. This raises the attached top filter member a slight distance upwardly. Figure 6 shows the hinge for the top container 13. This container normally occupies the solid line position of Figure 6, but when the cam rod 45 is rotated, it is lifted upwardly adjacent the hinge to the chain line position.

The above described hinge arrangement is of great value in placing the sheets of filter paper. It is found that unless some means is provided for lifting the container which lies on top of a sheet of filter paper away from such sheet during the time that the container is being lowered to its working position, the paper is likely to be pinched, torn or displaced. The arrangement also permits of the ready use of several thicknesses of filter paper. The hinge is not intended to serve as a hold-down member for its attached container, bolts 49 hinged to the casting 27 at 50 being provided for this purpose. In operation, raw water is supplied through the conduit 5, which is preferably provided with a valve 51 and a pressure gauge 52. The conduit 5 terminates in the control valve 28 which will be hereinafter described in detail.

As above stated, the conduit 8 also terminates in the valve 28. The conduit 7 is preferably provided with a branch conduit 53 having a control valve 54 therein, whereby water may be taken off after it passes through the sand filter and without being passed through the porous filter. The valve 54 permits of lowering the water level in the chamber 2 for the visual inspection of the sand surface. This is of great importance for hygienic reasons as most of the bacteria accumulate at the stop of the non-porous medium. It thus enables a user to tell when the sand surface should be scraped or replaced in part or in whole.

The conduit 19 is also connected into the valve 28 and terminates in a drain connection 55. A conduit 56 extends from the drain connection 55 to the trough 17 so as to take care of all water which drips from the edges of the filter sheets. Still another conduit 57 extends from the valve 28 to a valve 58 from which a conduit 59 extends downwardly to the drain connection 55. This last connection is provided for taking off water for a short period after the filter has been washed. At such time the water which passes through is somewhat cloudy and this is discharged to the sewer instead of being passed through the porous filters. It will be noticed that the conduit 59 terminates a short distance above the drain connection 55 so that a visual inspection of the water may be had.

The control valve is shown in detail in Figures 7 to 11 inclusive, as well as in Figure 4. It comprises a central tapered opening 60 in which the valve plug 30 is fitted. The opening 29 into which the supply conduit 5 is connected communicates with a chamber 61 surrounding the central tapered opening 60. Communication between the opening 60 and the chamber 61 is had through ports 62 and 63. The plug 30 is hollow and is divided into two chambers 64 and 65 by a division wall 66. The plug 30 is provided with a port 67 which, when the valve plug 30 is in "filter" position, registers with the port 62. Water is thus free to pass from the supply conduit 5 to the chamber 61 and thence through the ports 62 and 67 to the chamber 64 within the valve plug 30. This plug is open at the end and the water is therefore free to flow into a chamber 68 having an opening 69 through which the water is free to flow to the pan 6, from which it flows through the sand filter and thence upwardly through the conduit 8, back to the control valve 28.

Figure 10:
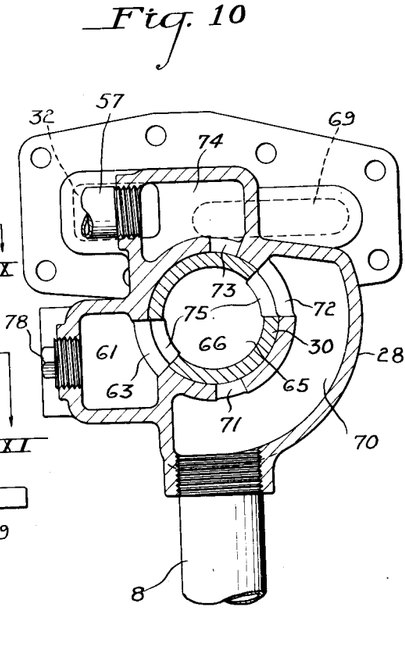
Figure 10 is a vertical section taken on the line X—X of Figure 9, but with the plug in place.
Figure 11:
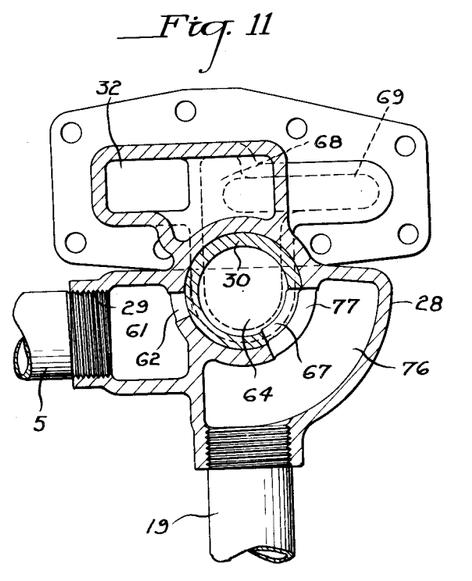
Figure 11 is a vertical section taken on the line XI—XI of Figure 9, but with the plug in place.

The conduit 8 terminates in a chamber 70 which in part surrounds the central tapered opening 60. It is connected to this opening through ports 71 and 72 (Figure 10).

Substantially opposite the port 71 there is provided a port 73 communicating with a chamber 74 which terminates in the outlet 32. The plug 30 is provided with passages 75 which, when the plug is in the "filter" position, register with the ports 71 and 73. Water is thus free to pass from the chamber 70 through the port 71 and its corresponding ports 75, across the chamber 65, through the opposite port 75 and the port 73, thence through the chamber 74 to the chamber 33 and thence to the porous filter.

When the valve plug 30 is moved to the "wash" position, it is necessary to provide communication between the supply conduit 5 and the conduit 8. As will be seen from Figure 10, ports 63 and 72 lie opposite one another, and the valve is so arranged that when the plug 30 is rotated from "filter" to "wash" position, the ports 75 register with the ports 63 and 72 and thus provide free communication from the chamber 61 through the chamber 65 to the chamber 70 and thence to the conduit 8. It will be noted that with the plug 30 in this position, the porous filter is completely isolated from the fluid path.

During the washing operation, it is also necessary to provide free communication between the pan 6 and the drain conduit 19. For this purpose, there is provided a chamber 76 having a port 77 adapted to register with the port 67 when the plug 30 is in the "wash" position. Water is thus free to pass from the pan 6 through the opening 69 to the chamber 68, thence to the chamber 64 in the valve, thence to the ports 67 and 77 to the chamber 76 and into the conduit 19.

It will be noted that the ports 67 and 75, as well as the ports 63, 72 and 77 are relatively large as compared with the ports 62, 71 and 73. This arrangement is desirable because the large ports are used during the washing operation when the pressure in the system is relatively low and when a relatively large quantity of water is handled per unit of time, while the smaller ports are used in the filtering step and permit of maintaining the desired relative pressure conditions in the various parts of the filter.

The conduit 57 is connected to the chamber 74 as shown in Figure 10, and is effective for taking off the cloudy water which comes through the sand filter during or immediately after the washing step. It will be noted that the chamber 61 is provided with a plug 78. This plug is used to close an opening which is provided for supporting the cores employed during the manufacture of the valve casing.

When the valve plug 30 is in the "closed" position, the port 67 lies midway between the ports 62 and 77, while one of the ports 75 lies midway between the ports 71 and 72 and the other lies midway between the ports 73 and 63. The projecting end of the plug 30 is covered with a shield 79 secured to the valve casing by machine screws 80 and having the various positions of the valve marked thereon. The shield 79 is provided with a threaded bushing 81 which bears against the handle 31. The handle has a projecting collar 31$^a$ which bears against a packing 30$^a$. This packing seals the rear end of the valve and may be tightened or loosened by adjusting the bushing 81. This also provides a cushioned means for holding the plug in place. A screw 82 passes through the bushing 81 and is threaded into the end of the plug 30. The head of this screw fits into a counterbore in the bushing 81 of such depth that the screw does not interfere with the adjustment of the bushing. If, however, the plug should "freeze" or stick in the valve casing, it may be readily withdrawn or loosened by backing off the bushing 81 to such a distance that it engages the head of the screw 82 and thus exerts an outward pull on the plug 30.

Figures 12, 13:
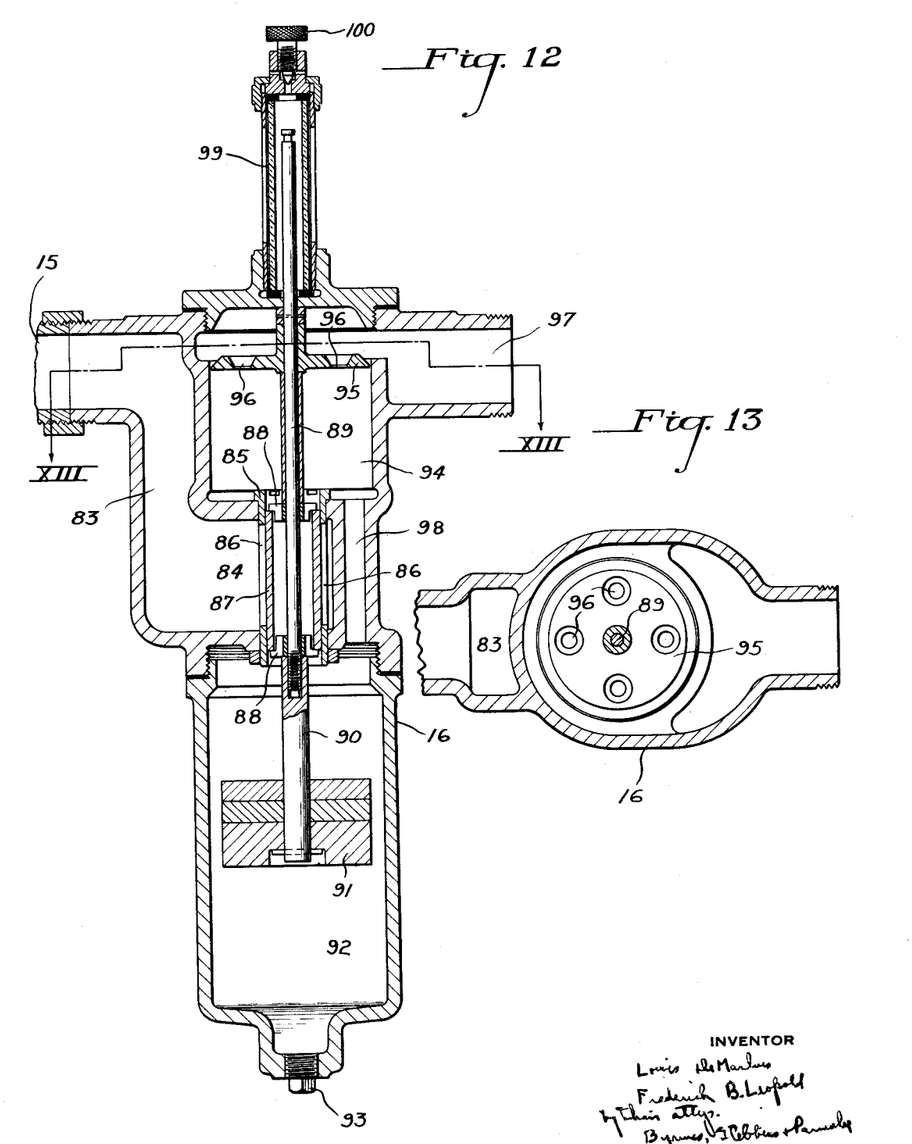
Figure 12 is a vertical section through the rate controller.
Figure 13 is a section taken on the line XIII—XIII of Figure 12.

The rate controller 16 is shown in detail in Figures 12 and 13. The filtered water passes off through the conduit 15 (see Figure 5) and thence to a passage 83 in the body of the rate controller. The passage 83 extends downwardly and terminates in a chamber 84. A sleeve 85, open at top and bottom, extends through the chamber 84 and is provided with slots 86. The sleeve 85 constitutes the stationary part of the rate control valve. The moving part of the valve is a tube 87 which is slidable up and down in the sleeve 85. The tube is carried by spiders 88 mounted on a rod 89. An extension 90 secured to the bottom of the rod 89 carries weights 91 which normally urge the tube 87 downwardly so as to give the water free passage through the slots 86 to the interior of the sleeve 85. The water may pass between the arms of the upper spider 88 and thus downwardly through the tube 87 to a chamber 92, which contains the counterweights 91. This chamber constitutes no part of the active fluid path, but simply provides space for the weights 91, and eliminates any necessity for a stuffing connection. It is provided with a plug 93 for drainage.

The chamber 92 becomes filled with water as soon as the filter is put into operation and the water subsequently supplied from the conduit 15 passes upwardly through the sleeve 85 to a chamber 94. The rod 89 carries a disk 95 whose periphery lies very close to the walls of the chamber 94 and which is provided with calibrated openings 96. All the water which flows out of the filter must pass either through the openings 96 or in the small space between the edge of the disk 95 and the wall of the chamber 94. A lifting force will therefore be exerted on the disk 95, this force arising from the loss of hydraulic head across the disk. It will be seen, therefore, that when no water is flowing, the disk 95 will lie at the bottom of the chamber 94, and the slots 86 will be wide open. Up to a certain flow rate, the force exerted against the disk 95 is not sufficient to overcome the weights 91 and the water simply passes upwardly through the openings 96 and around the disk 95 without moving any of the parts in the rate controller. However, when a certain flow is reached, the disk 95 is forced upwardly and the tube 87 closes off the openings 86 in part. This checks the flow rate in an amount depending upon the upward travel of the disk 95 and the consequent upward travel of the tube 87. A balance is quickly secured at some intermediate position of the disk 95. If the flow is increased, the disk is forced upwardly in a further amount and the valve opening is thus reduced. It will be seen that by regulating the weights 91 any maximum flow rate may be provided. This arrangement ensures that the filter will not be overloaded. Sand filters should not ordinarily be operated at a greater rate than two gallons per minute per square foot of filtering surface. If the rate is exceeded, the filter becomes a menace to health. The rate controller is therefore of great value in preventing overloading of the unit. Its value is particularly great in connection with a self-contained unit such as herein described, because it is found in practice that self-contained filter units as heretofore constructed have been almost invariably overloaded. The rate controller is also of value in that it prevents destruction of the filter disks employed in the porous filter unit.

The filtered water leaves the rate controller through a conduit 97. A conduit 98 between the chambers 92 and 94 is provided for making certain that uniform pressure conditions will prevail throughout the apparatus.

A sight glass 99 is provided at the top of the rate controller and the rod 89 projects upwardly therein. The position of the top of the rod 89 gives a visual indication of the position of the disk 95. A petcock 100 is provided at the top of the sight glass to take off collected air therein.

The invention may advantageously be employed not only in connection with sand filters, also with charcoal or zeolite filters or the like. Such filters can be used for longer periods of time if they are washed.

We have illustrated and described a preferred embodiment of the invention, but it will be understood that it is not limited to the form shown, as it may be otherwise embodied within the scope of the following claims:—

We claim:—

1. A self-contained filtration unit comprising separately contained non-porous filtering means and porous filtering means constituting an index to the condition of the non-porous filter means, means for passing water successively through the non-porous filter and then through the porous filter, means for reversing the water flow through the non-porous filter in order to wash the same, and means for diverting the wash water from the porous filter.

2. A filtration unit comprising a normally closed chamber adapted to sustain fluid pressure and containing a filter medium, means whereby water under pressure is supplied thereto for filtration, a hinged cover for the filter adapted to be opened so as to expose and render freely accessible the filter medium and means for supplying water to the filter medium in a reverse direction for washing the same, the cover having a water connection directly thereto, said connection being partially slidable upon turning movement of said hinged cover.

3. A filtration unit comprising a chamber having opposite walls perforated and adapted to receive filter disks, a chamber lying adjacent each of said perforated walls and provided with a corresponding perforated wall adapted to contact with said filter disks, and water connections to the chambers terminating in said chambers at points other than in or through the perforated disks, said chambers being pivotally mounted whereby they can be easily separated in order to replace the filter disks.

4. A filtration unit comprising a chamber having opposite walls perforated and adapted to receive filter disks, a chamber lying adjacent each of said perforated walls and provided with a corresponding perforated wall adapted to contact with said filter disks, and water connections for the several chambers, said connections being so arranged that imperforate filter disks may be employed, said chambers being pivotally mounted whereby they can be easily separated in order to replace the filter disks.

5. A filtration unit comprising a filter medium, a porous filter within the unit, connections whereby water may be passed through the two filters successively, connections whereby water may be passed through the filter medium in the reverse direction, a single valve for controlling the water flow through said connections and means for taking off water immediately after the water has been passed through the filter medium in the reverse direction and before passing through the porous filter.

6. A filtration unit comprising a chamber containing a non-porous filter medium, a cover for the chamber, the cover supporting a porous filter medium and a trough-like rim for the container adapted to collect water dripping from the filter medium in the cover.

7. In a filtration unit, non-porous filter means, porous filter means in sheet form having an observable portion constituting an index to the operation of the non-porous filter means, and means for admitting a substance to be filtered in a direction substantially parallel to the surface of the porous filter means.

8. In a filtration unit, a body of non-porous filtering medium, porous filtering means in sheet form having an observable portion constituting an index to the operation of the non-porous filter means and lying substantially in a horizontal plane, and means for passing a substance to be filtered downwardly through the non-porous medium and then laterally in contact with the porous means.

9. A self-contained filteration unit comprising non-porous filter means, visible porous filter means constituting an index to a condition of the non-porous filter means, and clamping means for said porous filter means permitting movement of liquid therepast through the porous filter means.

10. A self-contained filtration unit comprising non-porous filter means, porous filter means within the unit constituting an index to a condition of the non-porous filter means, means for passing water successively through the non-porous filter and then through the porous filter, and means for reversing the water flow through the non-porous filter in order to wash the same.

11. A filtration unit comprising a chamber having a filtering medium therein and a cover for said chamber comprising a plurality of separate parts mounted for independent rotation relative to said chamber, one of said parts supporting a second filtering medium and said other parts having co-operating passageways for permitting the passage of liquid through said second filter medium.

In testimony whereof we have hereunto set our hands.

LOUIS DE MARKUS.
FREDERICK B. LEOPOLD.